United States Patent [19]
Akulov

[11] 3,716,779
[45] Feb. 13, 1973

[54] MAGNETIC SPRING-CONTROLLED WINDING APPARATUS FOR GAGING THE THICKNESS OF NON-MAGNETIC COATINGS ON METAL PRODUCTS

[75] Inventor: Nikolai Sergeevich Akulov, Minsk, U.S.S.R.

[73] Assignee: Otdel Fiziki Nerazrushajuschego Kontrolya Akademii Nauk BSSR, Minsk, U.S.S.R.

[22] Filed: Feb. 1, 1971

[21] Appl. No.: 111,324

[52] U.S. Cl. ............................................. 324/34 TK
[51] Int. Cl. ............................................. G01r 33/12
[58] Field of Search ........................ 324/34 TK, 34 R

[56] References Cited

UNITED STATES PATENTS 3,521,160   7/1970   Nix et al. ........................... 324/34 TK

FOREIGN PATENTS OR APPLICATIONS 693,675   7/1953   Great Britain ..................... 324/34 TK

OTHER PUBLICATIONS

Harrison, E.; A Magnetic Thickness Gauge of New Design; Tour of Sc. Inst.; Vol. 29; No. 3; March 1952; pp. 89–91.

Primary Examiner—Robert J. Corcoran
Attorney—Waters, Roditi & Schwartz

[57] ABSTRACT

An apparatus for gauging the thickness of non-magnetic coatings on metal products comprising a winding arrangement including an auxiliary lever adapted to engage a main lever carrying a permanent magnet, a gear train having shaft mounted gears, one of the shafts in the gear train of the apparatus mounting an auxiliary spring element linked to said auxiliary lever, to provide movement of the permanent magnet toward an auxiliary magnet upon the former breaking contact with the surface of the coatings.

2 Claims, 1 Drawing Figure

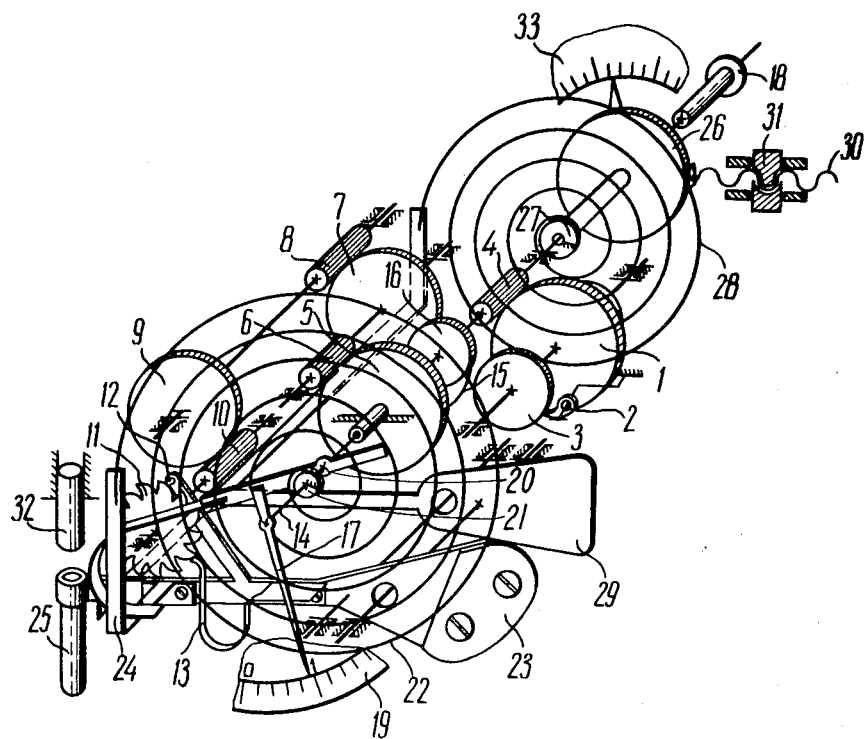

MAGNETIC SPRING-CONTROLLED WINDING APPARATUS FOR GAGING THE THICKNESS OF NON-MAGNETIC COATINGS ON METAL PRODUCTS

The present invention relates to an apparatus for gauging the thickness of non-magnetic coatings on metal products and may be used to gauge coatings applied by, for example, electroplating, metal-spraying or painting.

In the prior art, there is known an apparatus for gauging the thickness of non-magnetic coatings on metal products, comprising a clockwork actuating a wheel system one shaft of which carried a spring element linked to a lever mounting a permanent magnet which gauges the thickness of the coating, indicated on a scale as a function of the force required to break the permanent magnet away from the product being gauged.

This prior art apparatus is not sufficiently convenient in use, because it is calibrated in advance to cover a predetermined definite range of thicknesses and has no provisions for adjusting its sensitivity and calibration during the course of measurements when the thickness of the non-magnetic coatings being gauged lies outside the predetermined range.

An object of the present invention is to avoid the disadvantage encountered in the prior art.

A specific object of the invention is to provide an apparatus for gauging the thickness of non-magnetic coatings on metal products, which extends the range of thicknesses covered, enables this range to be divided into a number of sub-ranges and also has a movement which is braked more reliably after the permanent magnet has broken away from contact with the product being gauged.

With these objects in view, the invention resides in that an apparatus according to the invention includes an additional lever interacting with a main lever carrying a permanent magnet, and one of the shafts in a wheel system for the apparatus mounts an additional spring element linked with said additional lever, the tension of the additional spring element being indicated independently of the main scale.

For improved braking of the movement, it is preferable to provide in it an additional magnet to attract the main magnet after it has broken away from the surface of the product being gauged.

When embodied as described, the apparatus will perform its functions satisfactorily.

The invention will be more fully understood from the following description of a preferred embodiment when read in conjunction with the accompanying drawing which is a perspective view of an apparatus according to the invention.

Referring to the drawing, there is disclosed an apparatus which consists of a clockwork type arrangement in the form of a traction drum 1 the spring of which is wound by means of a ratchet gear assembly consisting of a spring-loaded pawl 2 and a toothed ratchet wheel 3. The traction drum 1 actuates a system of operatively interconnected gear wheels 4, 5, 6, 7, 8, 9, and 10, terminating in a brake wheel 11.

The brake wheel 11 has odd-shaped or inclined teeth and is adapted to be braked by a pin 12 and by a spring 13.

The brake wheel may also have the form of a plain round disc braked by blocks (not shown in the drawing).

All gear wheels, except the wheel 5, are permanently seated on their shafts, while the gear wheel 5 is free to rotate on the central shaft 14 and carries several pawls 15 which engage a ratchet wheel 16 permanently mounted on that shaft.

If the shaft 14 is actuated by, say, the traction drum 1, in the clockwise direction when looking at the shaft from the side of an indicating pointed 17 permanently mounted on the shaft the gear wheel 5 will rotate together with the central shaft 14 and drive the entire wheel system including the brake wheel 11. If, on the other hand, the central shaft is driven in the opposite direction by means of a winding knob 18 mounted on the same shaft 14, the pawls 15 will slip over the ratchet wheel 16, and the wheel system of the apparatus will not rotate, but the indicating pointer 17 will be brought back to its starting position relative to the zero division on the scale 19 of the apparatus, and the traction drum 1 driven by the gear 4 will be wound up.

Additionally, the central shaft 14 has permanently mounted on one of its end a spring-loaded reset lever 20 and a block 21 for attachment of the inner end of the main coiled flat spring 22 the outer end of which is attached to the main lever 23 via a pillar 24. The same end of the main lever 23 carries a permanent magnet 25 (which acts as the sensing element of the apparatus).

Arranged on the opposite end of the central shaft 14 and extending coaxially with it and rotatable relative thereto is a hand wheel 26 and a sleeve on which a block 27 is permanently mounted and to which block is attached the inner end of a second additional coiled flat spring 28. The outer end of the latter is attached to an end of a second additional lever 29. The same end of the additional lever 29 has a bent-away arm which interacts with the main lever 23. The levers 23 and 29 are free to swing on their fulcrums about which they are balanced in a static state.

The hand wheel 26 is free to rotate relative to the shaft 14 and may be locked by a lock-screw 30 when a lock-nut 31 is rotated.

Placed above and at some distance from the main permanent magnet 25 is an additional magnet 32.

Physically, the kinematic arrangement of the apparatus described above may be supported on a common baseplate built into a small-size case.

The apparatus disclosed herein operates as follows:

When the apparatus is wound for gauging, the reset lever 20 causes the end of the main lever 23 carrying the permanent magnet 25 to move to wards its lowermost position until the brake pin 12 runs against the brake wheel 11. As this happens, the end of the magnet 25 moves below the bearing plane of the apparatus, and the pin 12 locks the brake wheel 11.

When the bearing surface of the apparatus is placed on the surface to be gauged, the end of the magnet 25 lowers flush with the bearing surface, and the main lever 23 moves through an angle sufficient for the pin 12 to release the brake wheel 11. This unlocks the wheel 11, and the wheel system can now be driven by the clockwork (the traction drum 1). The central shaft 14 also rotates clockwise together with the wheel system, and the inner end of the main coiled spring 22 is wound until it develops a torque sufficient to break the magnet 25 away from the surface being gauged.

At the instant the magnet 25 breaks away, the main lever 23 rotates about its pivot, and the brake spring 13 attached thereto comes into contact with the brake wheel 11 and stops it together with the central shaft 14, the coiled spring 22, and the indicating pointer 17.

After the magnet 25 has broken clear of the product being gauged, it is attracted by the additional magnet 32, thereby ensuring the reliable braking of the movement.

If the complete angle of twist proves to be insufficient for the main coiled spring 22 to develop a torque for breaking the magnet 25 clear of the product being gauged, a stronger additional coiled spring 28 is brought into action. For this purpose, the lock nut 31 is rotated until the lock-screw 30 moves away from the hand wheel 26, the latter is turned until the coiled spring 28 is twisted through the requisite angle, and the hand wheel 26 is again locked. The torque thus produced by the additional spring 28 is applied via the additional lever 29 to the main lever 23 at the point of contact between these levers, tending to move the end of the main lever 23, upwardly so as to break the magnet 25 away from the surface of the product. The additional spring 28 considerably extends the overall range of thicknesses covered by the apparatus with the same sensitivity of the coiled spring 22 in view of the fact that the overall range is divided into a number of sub-ranges each of which corresponds to a certain definite angle of twist of the spring 28, and which is registered on an additional scale 33.

What is claimed is:

1. An apparatus for gauging the thickness of non-magnetic coatings on metal products, comprising: a spring drive; a gear train including a plurality of gears mounted on shafts actuated by said spring drive; a spring element mounted on one of the shafts of said gear train; a pivotable lever linked to said spring element; a permanent magnet fastened to one end of said lever adapted to contact and gauge the thickness of the coating; scale means associated with said spring element providing thickness indication as a function of the spring force required to break contact between said magnet and the surface of said coating; an auxiliary pivotable lever having a projecting portion adapted to engage the lever supporting said permanent magnet; an auxiliary spring element being mounted on one of the shafts of said gear train and linked to said auxiliary lever and being adjustable to vary the force on said auxiliary lever and thereby the force on the first mentioned lever, and means for indicating the tension force of said auxiliary spring independently of said scale said latter indication in conjunction with the scale indication indicating thickness.

2. An apparatus as claimed in claim 1, comprising an auxiliary magnet positioned in proximity to said permanent magnet, said auxiliary magnet exerting an attractive force to said permanent magnet upon the latter breaking contact with the surface of said coating.

* * * * *